(12) United States Patent
Deng et al.

(10) Patent No.: US 7,914,856 B2
(45) Date of Patent: Mar. 29, 2011

(54) METHOD OF PREPARING WETTING-RESISTANT SURFACES AND ARTICLES INCORPORATING THE SAME

(75) Inventors: Tao Deng, Clifton Park, NY (US); Dennis Michael Gray, Delanson, NY (US); Todd Charles Curtis, Schenectady, NY (US); Yuk-Chiu Lau, Ballston Lake, NY (US); Dalong Zhong, Niskayuna, NY (US); Ming Feng Hsu, Niskayuna, NY (US); Nitin Bhate, Rexford, NY (US); Kripa Kiran Varanasi, Clifton Park, NY (US); Pazhayannur Ramanathan Subramanian, Niskayuna, NY (US); Margaret Louise Blohm, Schenectady, NY (US)

(73) Assignee: General Electric Company, Niskayuna, NY (US)

( * ) Notice: Subject to any disclaimer, the term of this patent is extended or adjusted under 35 U.S.C. 154(b) by 817 days.

(21) Appl. No.: 11/771,408

(22) Filed: Jun. 29, 2007

(65) Prior Publication Data

US 2009/0004379 A1    Jan. 1, 2009

(51) Int. Cl.
| | |
|---|---|
| *C23C 4/06* | (2006.01) |
| *C23C 4/08* | (2006.01) |
| *C23C 4/10* | (2006.01) |
| *C23C 4/18* | (2006.01) |
| *C23C 4/04* | (2006.01) |
| *B05B 5/00* | (2006.01) |
| *B05B 1/10* | (2006.01) |
| *B05B 1/36* | (2006.01) |

(52) U.S. Cl. ........ 427/450; 427/446; 427/451; 427/452; 427/453; 427/454; 427/455; 427/456

(58) Field of Classification Search ............... 427/454
See application file for complete search history.

(56) References Cited

U.S. PATENT DOCUMENTS

| | | | | |
|---|---|---|---|---|
| 5,389,456 | A | * | 2/1995 | Singh et al. ............ 429/27 |
| 5,407,048 | A | * | 4/1995 | Sievers ............... 192/70.14 |
| 6,107,214 | A | * | 8/2000 | Iyer ..................... 438/787 |
| 6,723,387 | B1 | * | 4/2004 | Kear et al. ............ 427/450 |
| 6,723,674 | B2 | | 4/2004 | Wang et al. |
| 6,974,640 | B2 | | 12/2005 | Gell et al. |
| 2005/0227045 | A1 | | 10/2005 | Oles et al. |
| 2006/0246297 | A1 | * | 11/2006 | Sakoske et al. .......... 428/426 |

FOREIGN PATENT DOCUMENTS

| | | |
|---|---|---|
| WO | WO01/12431 A1 | 2/2001 |
| WO | WO2006102347 A2 | 9/2006 |

OTHER PUBLICATIONS

Thermal Spraying: Practice, Theory, and Application, American Welding Society, Inc., 1985, p. 4.*

* cited by examiner

*Primary Examiner* — Katherine A Bareford
(74) *Attorney, Agent, or Firm* — Paul J. DiConza

(57) ABSTRACT

The present invention provides methods for manufacturing an article having a wetting-resistant surface. The method includes providing a mixture comprising a plurality of micron-sized first particles and a plurality of nano-sized second particles, and a binder; depositing the mixture onto a substrate to form a wetting-resistant surface via a thermal spray process. The mixture is deposited without substantial melting of the first and second particles. The wetting-resistant surface has wettability sufficient to generate, with a reference fluid, a static contact angle of greater than about 90 degrees.

21 Claims, 3 Drawing Sheets

Figure 1:
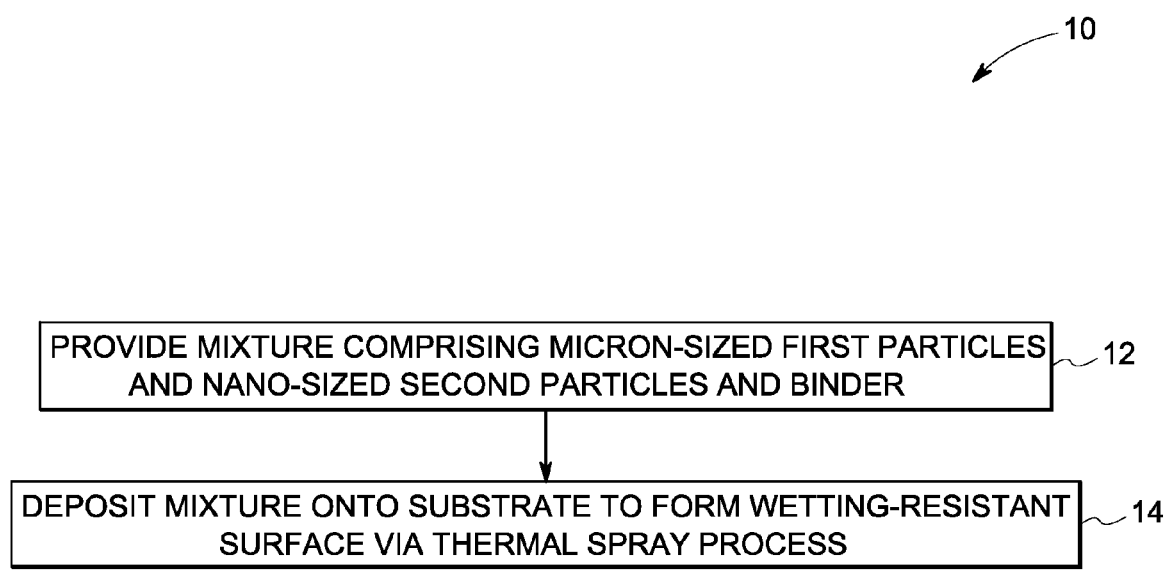

```
                    ┌─ 10
                    ▼

┌─────────────────────────────────────────────────────────┐
│ PROVIDE MIXTURE COMPRISING MICRON-SIZED FIRST PARTICLES │─ 12
│ AND NANO-SIZED SECOND PARTICLES AND BINDER              │
└─────────────────────────────────────────────────────────┘
                              │
                              ▼
┌─────────────────────────────────────────────────────────┐
│ DEPOSIT MIXTURE ONTO SUBSTRATE TO FORM WETTING-RESISTANT│─ 14
│ SURFACE VIA THERMAL SPRAY PROCESS                       │
└─────────────────────────────────────────────────────────┘
```

METHOD OF PREPARING WETTING-RESISTANT SURFACES AND ARTICLES INCORPORATING THE SAME

BACKGROUND

The invention relates generally to a method of modifying the surface of an article. More particularly, the invention relates to a method of preparing wetting-resistant surfaces. The invention also relates to articles with surfaces exhibiting wetting resistance.

Hydrophobic and super-hydrophobic surfaces are desirable in numerous applications, such as windows, DVD disks, cooking utensils, clothing, medical instruments, automotive and aircraft parts, and textiles. Typically hydrophobic surfaces have been created by changing surface chemistry or by increasing the surface roughness via surface texturing so as to increase the true or effective surface area, or by combining both of these methods. Altering the surface chemistry of the surface typically involves coating the surface with a hydrophobic coating. However, most of such hydrophobic coatings suffer from poor adhesion to the surface, lack mechanical robustness, and are vulnerable to scratches. Moreover, most of the existing techniques for altering the wetting resistance of the surface suffer from certain drawbacks, such as processes that are time consuming, difficult to control, expensive or ineffective in producing films with sufficient durability. Therefore, there is a need for an inexpensive, easy, and effective means for achieving surfaces with high wetting resistance.

BRIEF DESCRIPTION

Embodiments of the present invention meet these and other needs. In one embodiment of the present invention, a method for manufacturing an article having a wetting-resistant surface is provided. The method includes providing a mixture comprising a plurality of micron-sized first particles and a plurality of nano-sized second particles, and a binder; and depositing the mixture onto a substrate to form a wetting-resistant surface via a thermal spray process. The mixture is deposited without substantial melting of the first and second particles. The wetting-resistant surface has wettability sufficient to generate, with a reference fluid, a static contact angle of greater than about 90 degrees.

In another embodiment of the present invention, a method for manufacturing an article having a wetting-resistant surface is provided. The method includes providing a mixture comprising a plurality of micron-sized first particles and a plurality of nano-sized second particles, and a binder; thermal spraying the mixture at a temperature low enough to prevent substantial melting of the first and second particles; depositing the mixture onto a substrate to form a coating; and depositing a low surface energy layer onto the coating to create a wetting-resistant surface. The wetting-resistant surface has wettability sufficient to generate, with a reference fluid, a static contact angle of greater than about 90 degrees.

These and other aspects, advantages, and salient features of the present invention will become apparent from the following detailed description, accompanying drawings, and appended claims.

DRAWINGS

Figure 2:
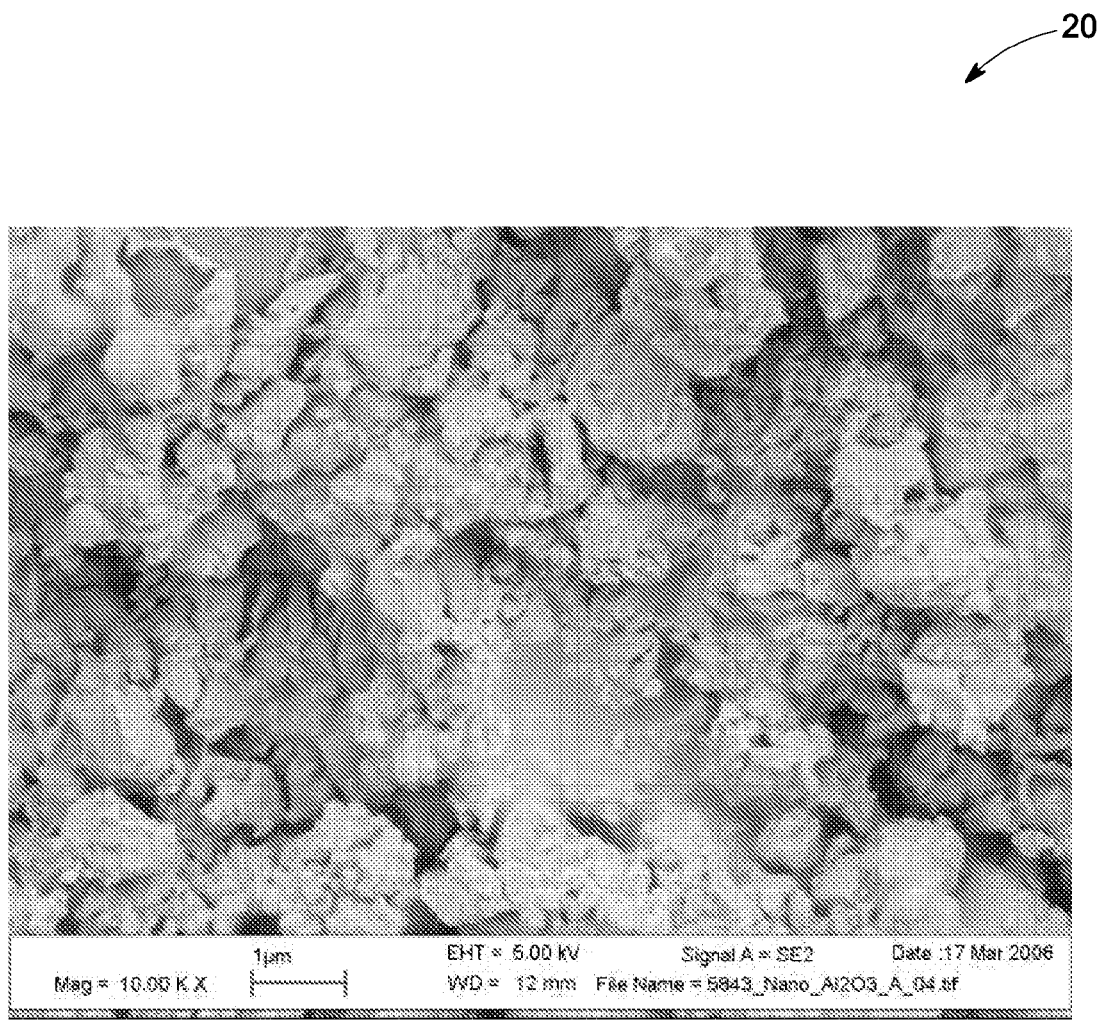
Figure 3:
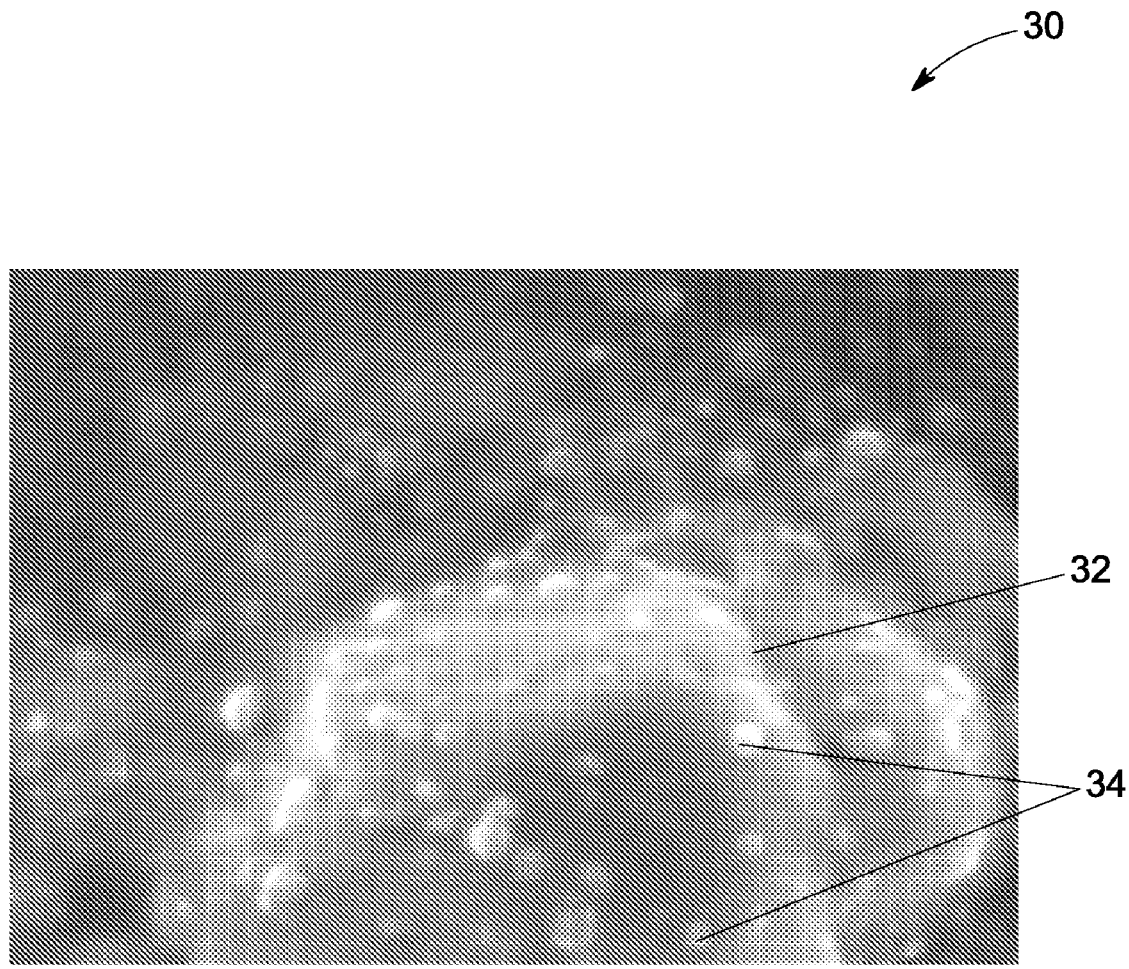

These and other features, aspects, and advantages of the present invention will become better understood when the following detailed description is read with reference to the accompanying drawings in which like characters represent like parts throughout the drawings, wherein:

FIG. 1 is a flow chart of a method for manufacturing an article having a wetting-resistant surface, according to embodiments of the present invention; and FIG. 2 is a typical scanning electron microscopy (SEM) image of a wetting-resistant surface generated by the embodiment of the invention; and FIG. 3 is a typical scanning electron microscopy (SEM) image of a wetting-resistant surface generated by the embodiment of the invention.

DETAILED DESCRIPTION

In the following description, like reference characters designate like or corresponding parts throughout the several views shown in the figures. It is also understood that terms such as "top," "bottom," "outward," "inward," and the like are words of convenience and are not to be construed as limiting terms. Furthermore, whenever a particular feature of the invention is said to comprise or consist of at least one of a number of elements of a group and combinations thereof, it is understood that the feature may comprise or consist of any of the elements of the group, either individually or in combination with any of the other elements of that group.

As used herein, the term "contact angle" is referred to as the angle a stationary drop of a reference liquid makes with a horizontal surface upon which the droplet is disposed. "Substantial melting" as used herein is meant to encompass any kind of melting, softening or particle morphology deformation. In other words, the particles are thermal sprayed under conditions such that the particles do not melt even partially and do not alter their particle shape substantially. Of course, one skilled in the art will recognize that an occasional deformation is to be expected under thermal spraying conditions, and so such variations are contemplated and fall within the scope of the invention.

Contact angle is used as a measure of the wettability of the surface. If a liquid spreads completely on the surface and forms a film, the contact angle is 0 degrees. As the contact angle increases, the wetting resistance increases, up to a theoretical maximum of 180 degrees, where the liquid forms spherical drops on the surface. The term "wetting-resistant surface" is used to describe surfaces having very high wetting resistance to a particular reference liquid; "hydrophobic" is a term used to describe a wetting resistant surface where the reference liquid is water. As used herein, the term "wetting-resistant surface" will be understood to refer to a surface that generates a contact angle of greater than about 90 degrees with a reference liquid. Because wetting resistance depends in part upon the surface tension of the reference liquid, a given surface may have a different wetting resistance (and hence form a different contact angle) for different liquids. As used herein, the term "substrate" is not construed to be limited to any shape or size, as it may be a layer of material, multiple layers or a block having at least one surface of which the wetting resistance is to be modified.

According to embodiments of the present invention, a method for manufacturing an article having a wetting-resistant surface is provided. A wetting-resistant surface, in one embodiment, exhibits resistance to wetting by water. In another embodiment, the wetting-resistant surface exhibits resistance to wetting by other liquids such as, for example, alcohols and the like.

Turning now to the figures, FIG. 1 is a flow chart 10 of a method for manufacturing an article having a wetting-resistant surface, according to embodiments of the present invention. The method comprises providing a mixture comprising a plurality of micron-sized first particles and a plurality of nano-sized second particles and a binder in step 12; depositing the mixture onto a substrate to form a wetting-resistant surface via a thermal spray process in step 14. The mixture is deposited without substantial melting of the first and second particles. The wetting-resistant surface has wettability sufficient to generate, with a reference fluid, a static contact angle of greater than about 90 degrees.

As noted, a mixture comprising a plurality of micron-sized first particles and a plurality of nano-sized second particles and a binder is provided in step 12. Typically, the micron-sized first particles, nano-sized second particles, and the binder are homogenously mixed. They may be mixed by any known mixing processes either by a dry mixer or involving a common solvent. In certain embodiments, the binder may be provided along with the first or the second particles. The choice of materials for the first and second particles in part depends on the end use of the wetting-resistant surface, which in turn depends on the desired contact angle and the operating conditions of the wetting-resistant surface. It is typically desirable that the first and second particles do not substantially melt during the deposition process.

The inventors have discovered that the particular combination of micron sized first particles and nano sized second particles, processed in accordance to the embodiments described herein, advantageously leads to a wetting-resistant surface having a particular desired microstructure. The wetting-resistant surface thus generated has a texture comprising a plurality of nanoscale features disposed onto a plurality of micron-sized features, as discussed in detail below. The present inventors have demonstrated that by adopting a thermal spraying technique under conditions so as to prevent substantial melting of particles or deformation of particle morphologies, good control over the microstructure of the deposited surface is possible through control of particle sizes and morphologies of the micron-sized and nano-sized particles. Moreover, the present inventors have demonstrated that the wetting resistance of the surface may be controlled.

The micron-sized first particles comprise a material selected from the group consisting of a metal, a ceramic, a cermet, and an intermetallic material. Exemplary metals include steel, stainless steel, nickel, titanium, aluminum or any alloys thereof. In some embodiments, the metal comprises a titanium-based alloy, an aluminum-based alloy, a cobalt-based alloy, a nickel-based alloy, an iron-based alloy or any combinations thereof. Non-limiting examples of a ceramic includes an oxide, a mixed oxide, a nitride, a boride or a carbide. Examples of suitable ceramics include, but are not limited to, carbides of silicon or tungsten; nitrides of boron, titanium, silicon, or titanium; stibinite ($SbS_2$), and titanium oxynitride. In one particular example, the nitride comprises boron nitride. In another embodiment, the micron-sized first particles comprise intermetallic particles. Exemplary intermetallic particles include, without limitation, silicides and aluminides.

The choice of the particle sizes of the micron-sized and nano-sized particles depend partly on the feature sizes on the wetting-resistant surface to be generated. The particles may be of any suitable shape. When the particles are not spherical, the particle size as defined herein represents the particle size measured along the smallest dimension. In one embodiment, the micron-sized first particles have a median particle size in the range from about 1 micrometer to about 100 micrometers. In another embodiment, the micron-sized first particles have a median particle size in the range from about 1 micrometer to about 10 micrometers. In one embodiment, the nano-sized second particles comprise a material selected from the group consisting of a ceramic and a cermet. The ceramic may be an oxide, a carbide, a nitride, a boride, a carbonitride, a borocarbide, or an oxynitride. An example of a suitable oxide includes, but is not limited to, alumina, zirconia, yttria, tantalum oxide, and lanthanoid oxide. An example of a suitable nitride includes, but is not limited to, boron nitride and carbon nitride.

Typically, the nano-sized particles provide the nanoscale features on the wetting-resistance surface generated. Accordingly, the particle size of the nano-sized particle is chosen depending on the desired microstructure of the wetting-resistant surface. In one embodiment, the nano-sized second particles have a median particle size in a range from about 10 nanometers to about 500 nanometers. In another embodiment, the nano-sized second particles have a median particle size in the range from about 10 nanometers to about 50 nanometers.

The mixture to be thermal sprayed also comprises a suitable binder material. The binder used may depend partly on the choice of the micron-sized and nano-sized particles chosen and the spraying temperature, among other factors. An example of a suitable binder includes, but is not limited to, CoCr, Co, Ni, NiCr, FeCr, and any combinations of these. In an exemplary embodiment, the binder comprises CoCr. Typically, during deposition, the binder gets deformed and binds the particles to the surface of the substrate, and binds the nano-sized particles to the micron-sized particles.

The nano-sized second particles, micron-sized first particles, and the binder are mixed at an appropriate ratio. The ratio of the nano-sized particles in the mixture depends on their particle sizes. In one embodiment, the nano-sized second particles are present in the mixture in a range from about 0.1 r/R weight percent to about 1 r/R weight percent, wherein r is the mean diameter of the nano-sized second particle and R is the mean diameter of the micron-sized first particle In another embodiment the nano-sized second particles are present in the mixture in a range from about 0.5 r/R weight percent to about 1 r/R weight percent.

In step 14, the mixture is thermal sprayed on at least one surface of the substrate. In one embodiment, the material constituting the substrate comprises a metal. Exemplary metals include steel, stainless steel, nickel, titanium, aluminum or any alloys thereof. In some embodiments, the metal comprises a titanium-based alloy, an aluminum-based alloy, a cobalt-based alloy, a nickel-based alloy, an iron-based alloy or any combinations thereof. Further, the alloy may be a superalloy. In one particular embodiment, the superalloy is nickel-based or cobalt-based, wherein nickel or cobalt is the single largest elemental constituent by weight. Illustrative nickel-based alloy includes at least about 40 weight percent of nickel, and at least one component from the group consisting of cobalt, chromium, aluminum, tungsten, molybdenum, titanium and iron. Examples of nickel-based superalloys are designated by the trade names Inconel®, Nimonic®, Rene® (e.g., Rene®80, Rene®95, Rene®142 and Rene®N5), and Udimet®, and include directionally solidified superalloys and single crystal superalloys. Illustrative cobalt-based alloys include at least about 30 weight percent cobalt and at least one component from the group consisting of nickel, chromium, aluminum, tungsten, molybdenum, titanium and iron. Examples of cobalt-based superalloys are designated by the trade names Haynes®, Nozzalloy®, Stellite® and Ultimet®.

In one particular embodiment, the substrate made of metals or their alloys are designed for high temperature applications.

In one embodiment, the temperature is greater than about 400 degrees Celsius (° C.). In some embodiments, the temperature is greater than about 1000° C.

In some embodiments, the material constituting the substrate comprises a ceramic. Non-limiting examples of ceramics include oxides, mixed oxides, nitrides, borides and carbides. Specific examples of ceramics include, but are not limited to, carbides of silicon or tungsten; nitrides of boron, titanium, silicon, or titanium; stibinite ($SbS_2$), and titanium oxynitride.

The substrate may form a component or a part of a component for which having one or more than one wetting-resistant surface would be desirable. In one embodiment, the substrate comprises a component of an aircraft. Non-limiting exemplary components of aircraft include a wing, a fuselage, a tail, and an aircraft engine component. Non-limiting exemplary aircraft engine components include a nacelle lip, a splitter leading edge, a booster inlet guide vane, a fan outlet guide vane, a fan blade, a turbine blade, a turbine vane, and a sensor shield.

In some embodiments, the substrate comprises a component of a turbine assembly. In some embodiments, the turbine assembly is selected from the group consisting of a gas turbine assembly, a steam turbine assembly, and a wind turbine assembly. In a wind turbine assembly, icing is a significant problem as the build-up of ice on various components such as anemometers and turbine blades reduces the efficiency and increases the safety risks of wind turbine operations. In one embodiment, the substrate is a component of a wind turbine, such as a turbine blade, an anemometer, or a gearbox. Exemplary components of turbine assemblies other than wind turbine assemblies include, but are not limited to, a turbine blade, a low-pressure steam turbine blade, a high-pressure steam turbine blade, a compressor blade, a condenser, and a stator component.

As will be appreciated, providing the substrate also may include pre-treatment processes on the surface of the substrate. In one example, the substrate is cleaned of organic contaminants and/or is polished prior to further processing steps.

In step 14, the mixture is thermal sprayed on at least one surface of the substrate. The thermal spraying step may be performed using any conventional thermal spraying process that is suitable for the selected combination of materials. A number of thermal spray processes are known in the art. These include, but are not limited to, high velocity air fuel (HVAF) process, high velocity oxy-fuel (HVOF) process, flame spraying, and detonation-gun spraying. Each one of these techniques may have specific advantages for specific materials systems. For example, HVAF process utilizes a supersonic jet of low temperature "air-fuel gas" combustion products and hence the particles are exposed to lower temperatures as compared to HVOF process. One skilled in the art would know to choose a suitable thermal spraying technique depending on the combination of materials chosen.

One consideration in selecting the thermal spray process and the processing parameters is to ensure that at the thermal spraying temperature, the particles do not substantially melt or soften or deform considerably. In one embodiment, thermal spraying is at a temperature in the range from about 1600° C. to about 2000° C. In one embodiment, thermal spraying the mixture comprises thermal spraying at a temperature in the range from about 1900° C. to about 2000° C. Typically, these temperatures are much lower than the melting temperature of the first and second particles to be sprayed. In one embodiment, the spraying temperature is lower than $\frac{2}{3}^{rd}$ the melting temperature of the lower melting point material. Under these conditions, the first and second particles get deposited in their solid state without substantial change in their morphology. Typically, the binder gets deformed and binds the particles to the surface. The coating is formed by the impact and kinetic energy of the particles, which causes the particles to get bonded to the surface. In one embodiment, the mixture is accelerated in a carrier gas to a mass flow rate in a range from about 3 pounds/hour to about 5 pounds/hour. The particle velocity is typically in a range from about 500 meters/second to about 700 meters/second. Typically, the carrier gas flow rate and the distance at which the substrate is placed are adjusted to get the desired microstructure.

The particle sizes and the volume ratio of the micron-sized and nano-sized particles, thickness of the coating, along with process parameters are typically controlled to generate a wetting-resistant surface with a desired contact angle. Typically, the wetting-resistant surface has wettability sufficient to generate, with a reference fluid, a static contact angle of greater than about 90 degrees. In one embodiment, the wetting-resistant surface has a wettability sufficient to generate, with a reference fluid, a static contact angle of greater than about 100 degrees. In another embodiment, the wetting-resistant surface has a wettability sufficient to generate, with a reference fluid, a static contact angle of greater than about 120 degrees.

Thermal spray processes are extensively used to generate wear-resistant coatings and thermal barrier coatings, but little has been reported regarding the use of thermal spray techniques to generate wetting-resistant surfaces or regarding control of process parameters to control the wetting resistance of the surface generated. The inventors surprisingly discovered that by choosing the process parameters so that during thermal spray the particles do not melt or deform, it is possible to generate a specific microstructure with enhanced wetting resistance. FIG. 2 shows a micrograph of a wetting-resistant surface 20 generated by thermal spray deposition of micron-sized WC-10Co-4Cr particles along with nano-sized $Al_2O_3$ particles. FIG. 3 shows a magnified image 30 of such a surface. The wetting-resistant surface 30 has a texture comprising a plurality of micron-sized features 32 upon which is disposed a plurality of nanoscale features 34. In many naturally occurring hydrophobic surfaces such as lotus leaves, many small sized features cover the solid surface, which themselves are covered with smaller sized features so that the contact angle of a liquid drop is high and rolls off the leaf easily. This kind of multi-texturing is expected to increase the contact angle significantly. The wetting-resistant surfaces have a surface enhancement factor of greater than about 1.2, where surface enhancement factor is defined as total surface area/projected surface area.

In certain embodiments, when the wetting resistance of the surface generated is not sufficiently high, the process further involves a step of modifying the wetting-resistant surface by applying a low surface energy layer as a top-coat over the surface. Examples of suitable materials for this layer include, without limitation, diamond-like carbon, titanium oxide, tantalum oxide, titanium nitride, titanium carbo-nitride, chromium nitride, chromium carbide, boron nitride, zirconium nitride, titanium carbide, tungsten carbide, molybdenum carbide, molybdenum boride, and tungsten boride. They may be deposited by any known deposition technique including chemical vapor deposition and physical vapor deposition. A person skilled in the art will know to choose a suitable material depending on the working conditions of the wetting resistant surface.

The wetting-resistant surface that is generated may be suitable for a number of applications. Most attractive applications include for aircraft parts and for turbine parts. In one embodiment, the wear-resistant surface forms a part of an aircraft. In another embodiment, the wear-resistant surface forms a part of a turbine assembly.

In an exemplary embodiment, the method for manufacturing an article having a wetting-resistant surface comprises: providing a mixture comprising a plurality of micron-sized first particles, a plurality of nano-sized second particles, and a binder; thermal spraying the mixture at a temperature low enough to prevent substantial melting of the first and second particles; and depositing the mixture onto a substrate to form a coating; and depositing a low surface energy layer onto the coating to create a wetting-resistant surface. The wetting-resistant surface has a wettability sufficient to generate, with a reference fluid, a static contact angle of greater than about 90 degrees.

The aforementioned embodiments present clear advantages over existing methods for generating wetting resistant surfaces. For example, it is expected that the present method is versatile to encompass a variety of different spray materials. This process may be adapted to many different substrate materials. This process can generate large area wetting resistant surfaces. With the right design of the spray instruments, this process can also be used to generate textures on curved structures, or inner structures of a confined space. Most of the conventionally known wetting-resistant coatings of ceramics or metals are based on etching of coatings. Though, there are a few reports on generation of wetting resistant surfaces by thermal spray processes, most of them are not suitable for spraying nano-sized particles. Moreover, most of them are based on partial melting of particles and there has been no good control of the morphology of coated surfaces that would facilitate generation of surfaces having high contact angles.

Example 1

Wetting-resistant surface generated by thermal spraying WC-10Co-4Cr (Amdry 5843, Sulzer-Metco), 5-30 microns in sizes along with 5 weight percentage of nanoparticles of $Al_2O_3$, 10-50 nanometers. Substrate used was UNS N07718 (designated by Universal Numbering System for Metals and Alloys (UNS)). The wetting-resistant surface was surface modified with a top coat of tridecafluoro 1,1,2,2-tetrahydrofluoro octyl trichlorosilane. Table 1 lists the process parameters used for the deposition.

TABLE 1

Process parameters used for spraying

| | |
|---|---|
| Gun Type | JP5000-HVOF |
| Substrate | 1.5" × 1.5" × 1/8" In718 w/tab |
| Primary Gas Pressure/Flow (scfh) (Oxygen) | 1850 @ 210 psi supply |
| Fuel Flow (gallons/hour) (Kerosene) | 6.0 @ 180 psi |
| Carrier Gas Flow (scfh) | 23 @ 50 psi supply |
| Combustion chamber pressure (psi) | 93 |
| Oxygen pressure to gun (psi) | 125 |
| Fuel line pressure to gun (psi) | 119 |
| Gun to Substrate Distance (inches) | 15 |
| Gun Speed (mm/sec) | 1200 |
| Type of Powder | Amdry 5843 WCCoCr + 5 wt/% $Al_2O_3$ |
| Powder Feeder | #4 Praxair 1264 |
| Type of Powder Injector | dual internal # 620180/feed tube # 450925 |
| Powder Feed Rate (powder feeder rpm/lbs/hr) | PF#4 –3.77/5 |
| Amount of Powder Used (lbs) | 0.64 |
| Air Cooling: (psi) | 50 |
| Gun Water Flow Rate (gpm) | 9 |
| Inflow Gun Water Temperature (° F.) | NA |

TABLE 1-continued

Process parameters used for spraying

| | |
|---|---|
| Outflow Gun Water Temperature (° F.) | NA |
| Coating Thickness (inches) | 0.003" |

Example 2

Comparative Example

Wetting-resistant surface generated by thermal spraying WC-10Co-4Cr (Amdry 5843, Sulzer-Metco), 5-30 microns in sizes along with 5 weight percent and 10 weight percent of nanoparticles of $Al_2O_3$, 10-50 nanometers. (Here, CoCr acts as a binder) Substrate used was UNS N07718 (designated by Universal Numbering System for Metals and Alloys (UNS)). Table 2 lists the change in contact angle with change in process parameters used for the deposition and the coating thickness.

TABLE 2

Variation in contact angle with change in deposition parameters.

| Sample | Low Oxygen Flow Rate (1700 Scfh) | Medium Oxygen Flow Rate (1750 Scfh) | High Oxygen Flow Rate (1850 Scfh) |
|---|---|---|---|
| 5 wt % $Al_2O_3$, 0.4 mil thickness | 139 | 138 | 140 |
| 5 wt % $Al_2O_3$, 3 mil thickness | 150 | 153 | 152 |
| 10% $Al_2O_3$, 3 mil thickness | 141 | | |

Table 2 shows that contact angle as high as 153 degree was obtained on a 3 mil thickness coating of WC-10Co-4Cr particles with 5 weight percent $Al_2O_3$ particles.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for manufacturing an article having a wetting-resistant surface comprising:
   providing a mixture comprising a plurality of micron-sized first particles and a plurality of nano-sized second particles, and a binder; wherein the micron-sized first particles have a median particle size in the range from about 1 micrometer to about 100 micrometers; and wherein the nano-sized second particles have a median particle size in the range from about 10 nanometers to about 500 nanometers;
   depositing the mixture onto a substrate to form a wetting-resistant surface via a thermal spray process, wherein the mixture is deposited without substantial melting of the first and second particles, wherein the binder gets deformed and binds the particles to the surface of the substrate during deposition, and binds the nano-sized particles to the micron-sized particles;
   wherein the wetting-resistant surface has a wettability sufficient to generate, with a reference fluid of water or alcohol, a static contact angle of greater than about 90 degrees; and wherein the wetting-resistant surface has a texture comprising a plurality of micron-sized features provided by the micron-sized particles, and wherein the plurality of features further comprises a plurality of nano-scale features provided by the nano-sized particles, and wherein the plurality of nanoscale features are disposed onto the plurality of micron-sized features.

2. The method of claim 1, wherein the micron-sized first particles comprise a material selected from the group consisting of a metal, a ceramic, a cermet, and an intermetallic material.

3. The method of claim 2, wherein the micron-sized first particles comprise the metal, and the metal is at least one selected from the group consisting of steel, stainless steel, nickel, titanium, aluminum, any alloys thereof.

4. The method of claim 2, wherein the micron-sized first particles comprise the ceramic, and the ceramic is at least one selected from the group consisting of an oxide, a mixed oxide, a nitride, a boride, a carbide, a carbonitride, a borocarbide, an oxynitride, and combinations thereof.

5. The method of claim 4, wherein the ceramic is at least one selected from the group consisting of carbides of silicon or tungsten; nitrides of boron, titanium, silicon, or titanium; stibinite ($SbS_2$), titanium oxynitride, and combinations thereof.

6. The method of claim 1, wherein the nano-sized second particles comprise a material selected from the group consisting of a ceramic, a cermet, and combinations thereof.

7. The method of claim 6, wherein the nano-sized second particles comprise the ceramic, and the ceramic is at least one selected from the group consisting of an oxide, a mixed oxide, a carbide, a nitride, a boride, a carbonitride, a borocarbide, an oxynitride, and combinations thereof.

8. The method of claim 7, wherein the ceramic comprises the oxide, and the oxide is at least one selected from the group consisting of alumina, zirconia, yttria, tantalum oxide, and lanthanoid oxide.

9. The method of claim 7, wherein the ceramic comprises the nitride, and the nitride is at least one selected from the group consisting of boron nitride and carbon nitride.

10. The method of claim 1, wherein the binder comprises a material selected from the group consisting of CoCr, Co, Ni, NiCr, and FeCr.

11. The method of claim 10, wherein the binder comprises CoCr.

12. The method of claim 1, wherein the nano-sized second particles are present in the mixture in a range from about 0.1 r/R weight percent to about 1 r/R weight percent, wherein r is the mean diameter of the nano-sized second particle and R is the mean diameter of the micron-sized first particle.

13. The method of claim 12, wherein the nano-sized second particles are present in the mixture in a range from about 0.5 r/R weight percent to about 1 r/R weight percent, wherein r is the mean diameter of the nano-sized second particle and R is the mean diameter of the micron-sized first particle.

14. The method of claim 1, wherein thermal spraying the mixture comprises accelerating the mixture in a carrier gas to a mass flow rate in a range from about 3 pounds/hour to about 5 pounds/hour.

15. The method of claim 1, wherein thermal spraying the mixture comprises accelerating the mixture in a carrier gas to a velocity in a range from about 500 meters/second to about 700 meters/second.

16. The method of claim 1, wherein the wetting-resistant surface has a wettability sufficient to generate, with the reference fluid, a static contact angle of greater than about 120 degrees.

17. The method of claim 1, wherein the wetting-resistant surface has a surface enhancement factor of greater than about 1.2.

18. The method of claim 1, further comprising modifying the wetting-resistant surface by applying a top coat comprising diamond-like carbon, titanium oxide, tantalum oxide, titanium nitride, titanium carbonitride, chromium nitride, chromium carbide, boron nitride, zirconium nitride, titanium carbide, tungsten carbide, molybdenum carbide, molybdenum boride, tridecafluoro 1,1,2,2-tetrahydroflouro octyl trichlorosilane, or tungsten boride.

19. The method of claim 1, wherein the wear-resistant surface forms a part of an aircraft.

20. The method of claim 1, wherein the wear-resistant surface forms a part of a turbine assembly.

21. A method for manufacturing an article having a wetting-resistant surface comprising:
    providing a mixture comprising a plurality of micron-sized first particles and a plurality of nano-sized second particles, and a binder; wherein the micron-sized first particles have a median particle size in the range from about 1 micrometer to about 100 micrometers; and wherein the nano-sized second particles have a median particle size in the range from about 10 nanometers to about 500 nanometers;
    thermal spraying the mixture at a temperature low enough to prevent substantial melting of the first and second particles; wherein the binder gets deformed and binds the particles to the surface of the substrate during deposition, and binds the nano-sized particles to the micron-sized particles;
    depositing the mixture onto a substrate to form a coating; and
    depositing a low surface energy layer onto the coating to create a wetting-resistant surface; wherein the low surface energy layer comprises diamond-like carbon, titanium oxide, tantalum oxide, titanium nitride, titanium carbonitride, chromium nitride, chromium carbide, boron nitride, zirconium nitride, titanium carbide, tungsten carbide, molybdenum carbide, molybdenum boride, tridecafluoro 1,1,2,2-tetrahydroflouro octyl trichlorosilane, or tungsten boride;
    wherein the wetting-resistant surface has a wettability sufficient to generate, with a reference fluid of water or alcohol, a static contact angle of greater than about 90 degrees; and wherein the coating has a texture comprising a plurality of micron-sized features provided by the micron-sized particles, and wherein the plurality of features further comprises a plurality of nano-scale features provided by the nano-sized particles, and wherein the plurality of nanoscale features are disposed onto the plurality of micron-sized features.

* * * * *